(No Model.)  J. H. ELWARD.  2 Sheets—Sheet 1.
Thrashing Machine.
No. 230,622.  Patented Aug. 3, 1880.
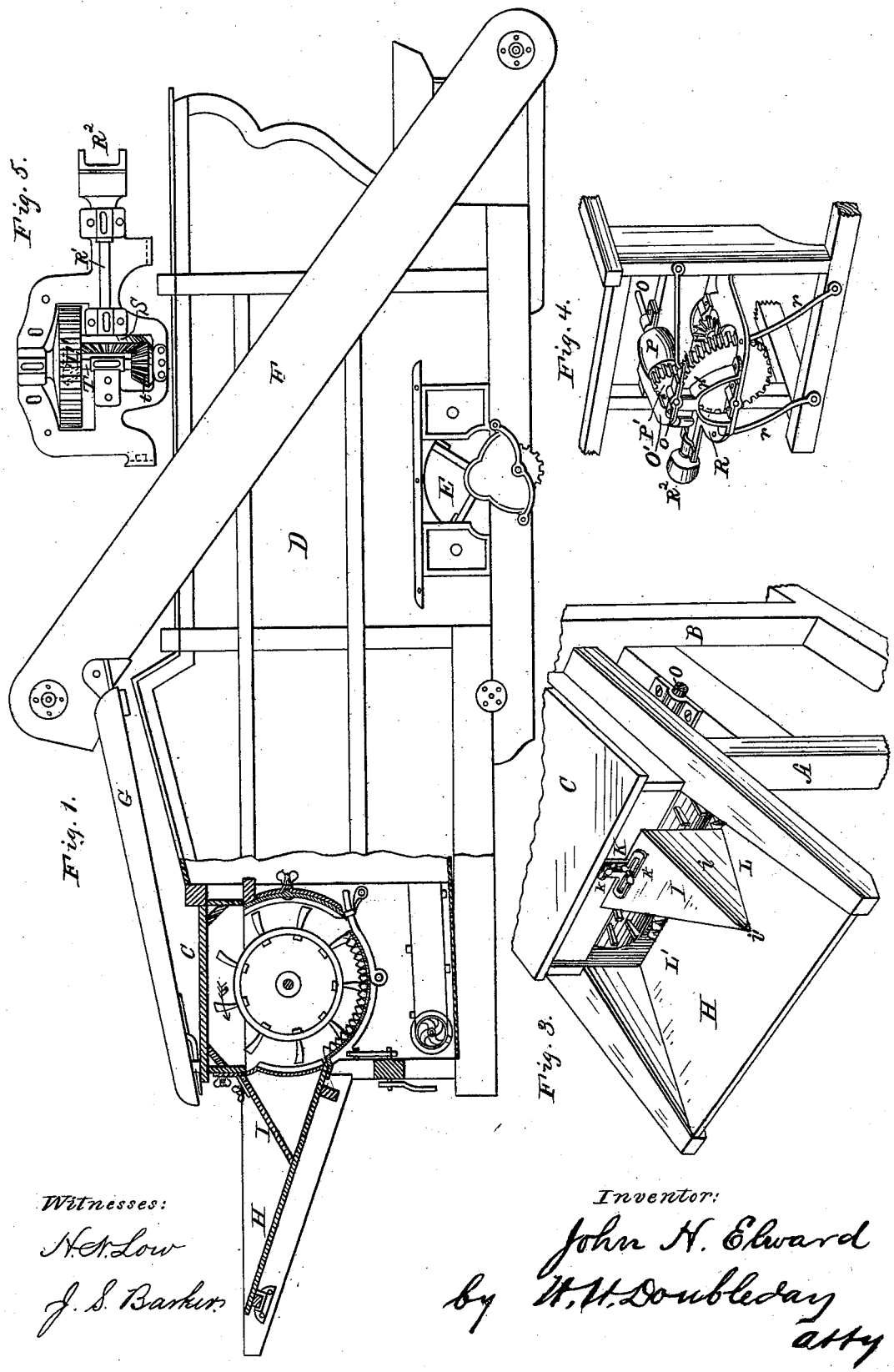
Witnesses:
H. N. Low
J. S. Barker
Inventor:
John H. Elward
by H. H. Doubleday
atty

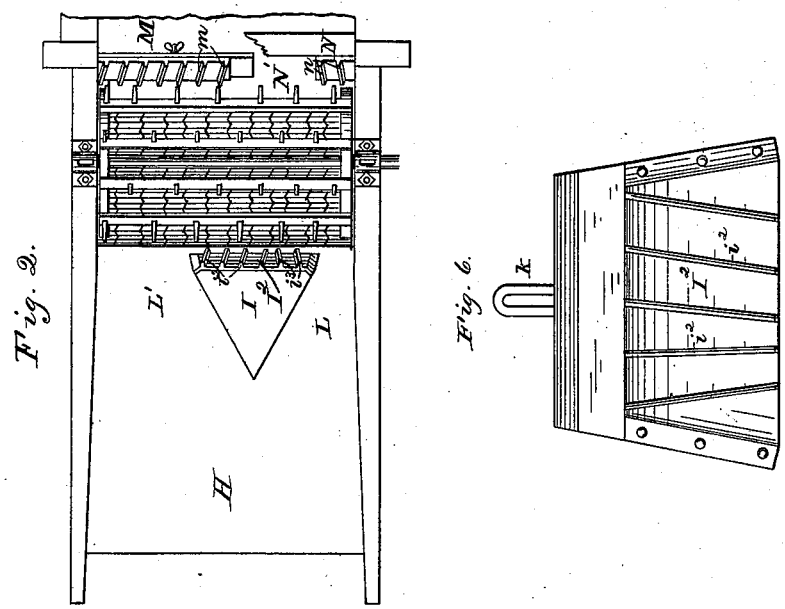

UNITED STATES PATENT OFFICE.

JOHN H. ELWARD, OF STILLWATER, MINNESOTA.

THRASHING-MACHINE.

SPECIFICATION forming part of Letters Patent No. 230,622, dated August 3, 1880.

Application filed April 21, 1880. (No model.)

*To all whom it may concern:*

Be it known that I, JOHN H. ELWARD, of Stillwater, in the county of Washington and State of Minnesota, have invented certain new and useful Improvements in Machines for Thrashing Grain and Clover; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 represents a thrashing and separating machine, shown partly in side elevation and partly in longitudinal vertical section. Fig. 2 is a top-plan view, and Fig. 3 is a perspective view, of a portion of the front end of the thrashing-machine. Fig. 4 is a perspective view of the duplex gearing through which power is imparted to the cylinder. Fig. 5 is a bottom-plan view of the devices shown in Fig. 4. Fig. 6 is a rear elevation of the divider.

The frame for the thrashing portion of the machine consists of the uprights A and B, the cover C, and suitable cross-pieces and casing. D represents the casing for the separating mechanism. E is the fan; F, the elevator which receives the tailings from the fan; G, the spout or trough for conveying the tailings from the elevator E to the trough H, through which trough the straw and grain are originally fed to the thrashing-cylinder.

All of the last-named parts may be of any ordinary or desired construction, their specific character forming no essential part of the present invention.

The cylinder and the accompanying parts of the machine herein shown are especially designed for the hulling of clover and for kindred work.

It has been heretofore the custom to so construct and operate clover-hullers that the tailings should be returned by the elevator from the fan, the sieves, and the shoe at E to the feed-trough H in such manner as to fall on the top of the straw which was at the time being fed to the cylinder. The result of carrying to the cylinder the tailings upon the top of or mixed with the newly-fed straw is that large quantities of the seed are carried out on the straw and wasted, owing to the fact that when the tailings are thus spread upon the straw the cylinder is prevented from acting properly to hull and separate the seeds from the tailings.

One part of this invention relates to an improved construction of devices for hulling the tailings, it consisting in dividing the feeding-trough H into two compartments and in feeding the tailings to the cylinder in a mass entirely separate from the straw as being originally fed at the same time.

I is a device arranged to divide the feeding-space into two compartments, as shown distinctly in Figs. 2 and 3. It is constructed to have two substantially vertical faces, $i$, meeting at the point $i'$ sufficiently far forward to properly divide the feeding-troughs. It is supported in place by means of a hanger, K, one arm of which is adjustably attached to the top or frame of the thrasher, as shown at $k$, and the other arm of which is adjustably attached to the divider, as shown at $k'$.

The tailings are returned by the elevator and delivered to the cylinder through the space marked L while the straw is being fed to the cylinder through the space marked L', the space L, under ordinary circumstances, being smaller than the space L', though by means of the adjustable hanger K the divider may be moved in such manner as to regulate the respective sizes of the spaces according to the character of the work that is necessary.

M represents a returning-board, situated behind the cylinder and provided with spiral ribs $m$, which assist in moving the straw longitudinally of the cylinder when the machine is in operation.

The divider I is provided upon its rear face with a returning board or plate, $I^2$, having spiral ribs $i^2$, corresponding in direction to the ribs $m$, and ribs $i^3$, situated in directions opposite to the ribs $i^2$.

N is a second plate in rear of the cylinder, situated substantially behind the open space L, and provided with spiral ribs $n$, corresponding to the ribs $i^3$ on the divider I. N' represents an open space in the plane of the returning-boards M N, through which space the material passes from the cylinder to the separating-table.

The tailings that pass through the open space L to the cylinder are, after being carried under the cylinder, received against the returning-board or hulling-board N, which throws them over the top of the cylinder to the front side thereof, and which, by means of the inclined or spiral ribs $n'$, throws them also toward the center of the cylinder. When returned to the front of the cylinder they impinge upon the rear side of the divider I, which guides them under the cylinder again, and which, by means of the inclined or spiral ribs $i^3$, thrusts them somewhat farther toward the center of the cylinder. After passing thus a second time beneath the cylinder they escape to the separating-table through the opening $N'$.

The straw which is fed to the cylinder through the opening $L'$ impinges against the returning-board M, which throws the material to the front again, and at the same time, by means of the spiral ribs $m$, guides it toward the opposite end of the cylinder.

The divider I receives the straw after it is carried over the top of the cylinder, guides it downward below the same, and, by means of its inclined ribs $i^2$, carries it to the plane of the opening $N'$, through which it passes to the separating-table. Thus the two classes of material are prevented from mixing while being acted upon by the cylinder, and a far more nearly perfect hulling can be obtained by thus operating upon them separated from each other.

Another important object aimed at in this invention is to so construct a thrashing and separating machine that power may be applied to it either from a horse-power in which the tumbling-rod turns from left to right or from a power in which said rod turns from right to left, and also that power may be applied to it by belt or by tumbling-rod without changing or removing any of the fixed parts of the machine.

Referring to Figs. 3 and 4, O represents the shaft of the cylinder. P represents a band-pulley secured to said shaft. Outside the pulley P, and in proximity thereto, a spur-pinion, $P'$, is attached to shaft O. The outer end of the shaft is mounted in a boxing at $o$, supported upon a bracket or arm, $O'$, attached to the frame of the machine. Below the arm $O'$ there is a frame, R, secured to the side of the frame of the machine and supported from below by braces $r$ $r$. $r'$ is a standard supported upon frame R and arranged to support the outer end of the arm or bracket $O'$.

$R'$ is a short shaft mounted upon said frame R, and having at its outer end a knuckle-joint, $R^2$, to which is coupled the tumbling-rod. At its inner end said shaft $R'$ carries a beveled spur-wheel, S.

T is a short shaft mounted in the frame R at right angles to the shaft $R'$, carrying at its outer end a spur-wheel, $T'$.

$t$ is a beveled pinion keyed to shaft T and arranged to mesh with the beveled spur-wheel S. When this beveled pinion $t$ is keyed to the shaft at its inner end it admits of the use of a horse-power of which the tumbling-rods turn from left to right; but when it is attached to the shaft at the outer end, as shown in dotted lines in Fig. 5, it admits of the use of a horse-power whose tumbling-rod turns from right to left, to produce in both cases a rotation of the spur-wheel $T'$ in the same direction.

The spur-wheel $T'$ meshes with the spur-pinion $P'$ on shaft O, through which pinion and shaft the wheel can rotate the cylinder whenever it, in turn, is rotated by shafts T and $R'$. Thus it will be seen that the cylinder may be revolved in the same direction by horse-powers of different construction.

The same result could be produced by using, instead of one pinion, (which must be put upon different ends of the shaft T, as the case may require,) two beveled pinions, of which one can be allowed to run loose, and the other can be keyed to the shaft at will.

When it is desired to apply power to the machine by steam with the construction shown in Figs. 4 and 5, the belt is placed upon the pulley P, and the tumbling-rod gearing last above described can be permitted to run loose. Thus the machine, by means of this duplex gear, is adapted to be operated either by steam or by horse-power without any change of gearing.

What I claim is—

1. In a thrashing-machine, the combination, with the cylinder, the feed-trough H, and the tailings-elevator, of the divider I, whereby the tailings and the straw may be fed to the cylinder separately from each other, substantially as set forth.

2. In a thrashing-machine, the combination, substantially as set forth, of the following elements, whereby power may be applied to the cylinder from a belt or from a tumbling-rod interchangeably, viz: the belt-pulley P, mounted on the cylinder-shaft, the spur-wheel $P'$, also mounted on said shaft outside of the belt-pulley P, the short shaft T, mounted entirely outside of the frame of the machine, the spur-wheel $T'$ and bevel-wheel $t$, both attached to said shaft T, the tumbling-rod shaft $R'$, and the bevel-wheel S, attached to shaft $R'$.

3. The combination, with a thrashing-cylinder and the shaft O, of the shaft T, mounted parallel to the shaft O and arranged to rotate the same, the shaft $R'$, mounted at right angles to shaft T, wheel S, attached to shaft R, and devices adapted to transmit motion in opposite directions alternately to shaft T from shaft $R'$, substantially as set forth.

4. The combination, with the frame of a thrashing-machine, the feed-trough H, and the divider I, of the adjusting hanger K, substantially as and for the purposes set forth.

5. The combination, with the thrashing-cylinder, of the returning-board M, provided with inclined ribs $m$, and the returning-board N, provided with ribs $n$ inclined in directions opposite to those of ribs $m$, substantially as and for the purposes set forth.

6. In a thrashing-machine, the combination, with the cylinder of the returning board or plate $I^2$ upon the front side of the cylinder, and provided with ribs $i^2$ and ribs $i^3$, inclined in directions opposite to each other, substantially as and for the purposes set forth.

In testimony that I claim the foregoing I have hereunto set my hand this 7th day of April, 1880.

JOHN HENRY ELWARD.

Witnesses:
  LEVI C. PROCTOR,
  R. W. CHAMBERS.